United States Patent
Chang et al.

(10) Patent No.: US 11,035,975 B2
(45) Date of Patent: Jun. 15, 2021

(54) USE OF GAP SUBS BEHIND A COIL ANTENNA IN ELECTROMAGNETIC INDUCTION TOOLS

(71) Applicant: Halliburton Energy Services, Inc., Houston, TX (US)

(72) Inventors: Paul Chin Ling Chang, Cypress, TX (US); Ilker R. Capoglu, Houston, TX (US); Hsu-Hsiang Wu, Sugarland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/757,483

(22) PCT Filed: Dec. 21, 2016

(86) PCT No.: PCT/US2016/068127
§ 371 (c)(1),
(2) Date: Mar. 5, 2018

(87) PCT Pub. No.: WO2018/118055
PCT Pub. Date: Jun. 28, 2018

(65) Prior Publication Data
US 2019/0033482 A1 Jan. 31, 2019

(51) Int. Cl.
*G01V 3/28* (2006.01)
*E21B 47/00* (2012.01)
(Continued)

(52) U.S. Cl.
CPC .............. *G01V 3/28* (2013.01); *E21B 17/003* (2013.01); *E21B 47/00* (2013.01);
(Continued)

(58) Field of Classification Search
None
See application file for complete search history.

(56) References Cited

U.S. PATENT DOCUMENTS 5,138,313 A * 8/1992 Barrington ............ E21B 17/003
175/40
6,163,155 A 12/2000 Bittar
(Continued)

FOREIGN PATENT DOCUMENTS

WO 2016108900 7/2016

OTHER PUBLICATIONS

International Search Report and Written Opinion for Application No. PCT/US2016/068127 dated Sep. 21, 2017.
(Continued)

Primary Examiner — Nasima Monsur
(74) Attorney, Agent, or Firm — Benjamin Ford; C. Tumey Law Group PLLC

(57) ABSTRACT

An electromagnetic induction tool and method. The electromagnetic induction tool may comprise a tool body, a gap sub may separate different sections of the tool body and may be positioned to at least partially hinder the flow of an axial current and an azimuthal current on the tool body. A coil antenna may be disposed over the gap sub. A method of increasing an electromagnetic field may comprise providing an electromagnetic induction tool. The electromagnetic induction tool may comprise a tool body, a gap sub may separate different sections of the tool body and may be positioned to at least partially hinder flow of an axial current and an azimuthal current on the tool body. A coil antenna may be disposed over the gap sub. The method may further comprise placing the electromagnetic induction tool into a wellbore and operating the coil antenna.

20 Claims, 8 Drawing Sheets

(51) Int. Cl.
*G01V 3/18* (2006.01)
*E21B 47/0228* (2012.01)
*E21B 47/18* (2012.01)
*G01V 3/30* (2006.01)
*E21B 17/00* (2006.01)
*E21B 49/00* (2006.01)

(52) U.S. Cl.
CPC .......... *E21B 47/0228* (2020.05); *E21B 49/00* (2013.01); *G01V 3/18* (2013.01); *G01V 3/30* (2013.01); *E21B 47/18* (2013.01)

(56) References Cited

U.S. PATENT DOCUMENTS

| | | | |
|---|---|---|---|
| 6,476,609 | B1 | 11/2002 | Bittar |
| 6,710,601 | B2 | 3/2004 | Rosthal et al. |
| 8,264,228 | B2 | 9/2012 | Bittar et al. |
| 8,749,243 | B2 | 6/2014 | Bittar et al. |
| 9,360,582 | B2 | 6/2016 | Bittar et al. |
| 2001/0050559 | A1 | 12/2001 | Wisler et al. |
| 2003/0076107 | A1* | 4/2003 | Fanini ..................... G01V 3/28 324/339 |
| 2004/0196047 | A1 | 10/2004 | Fanini et al. |
| 2005/0167100 | A1* | 8/2005 | Itskovich ............... A23B 4/031 166/248 |
| 2006/0103389 | A1 | 5/2006 | Bespalov et al. |
| 2008/0068022 | A1* | 3/2008 | Peter ..................... G01V 3/30 324/338 |
| 2008/0074336 | A1* | 3/2008 | Signorelli ............... G01V 3/28 343/719 |
| 2009/0301781 | A1 | 12/2009 | Fang et al. |
| 2011/0006775 | A1 | 1/2011 | Fang et al. |
| 2011/0257886 | A1 | 10/2011 | Itskovich et al. |
| 2015/0061682 | A1* | 3/2015 | Homan ................. E21B 47/102 324/339 |
| 2015/0285062 | A1* | 10/2015 | Logan ................... E21B 47/122 175/40 |

OTHER PUBLICATIONS

Y. Hue and F. L. Teixiera, "Numerical Mode-Matching Method for Tilted-Coil Antennas in Cylindrically Layered Anisotropic Media With Multiple Horizontal Beds," IEEE Trans. Geosci. Remote Sens., vol. 45, No. 8, pp. 2451-2462, Aug. 2007.

European Search Report and Written Opinion for Application No. PCT/US/2016068127 dated Apr. 28, 2020.

* cited by examiner

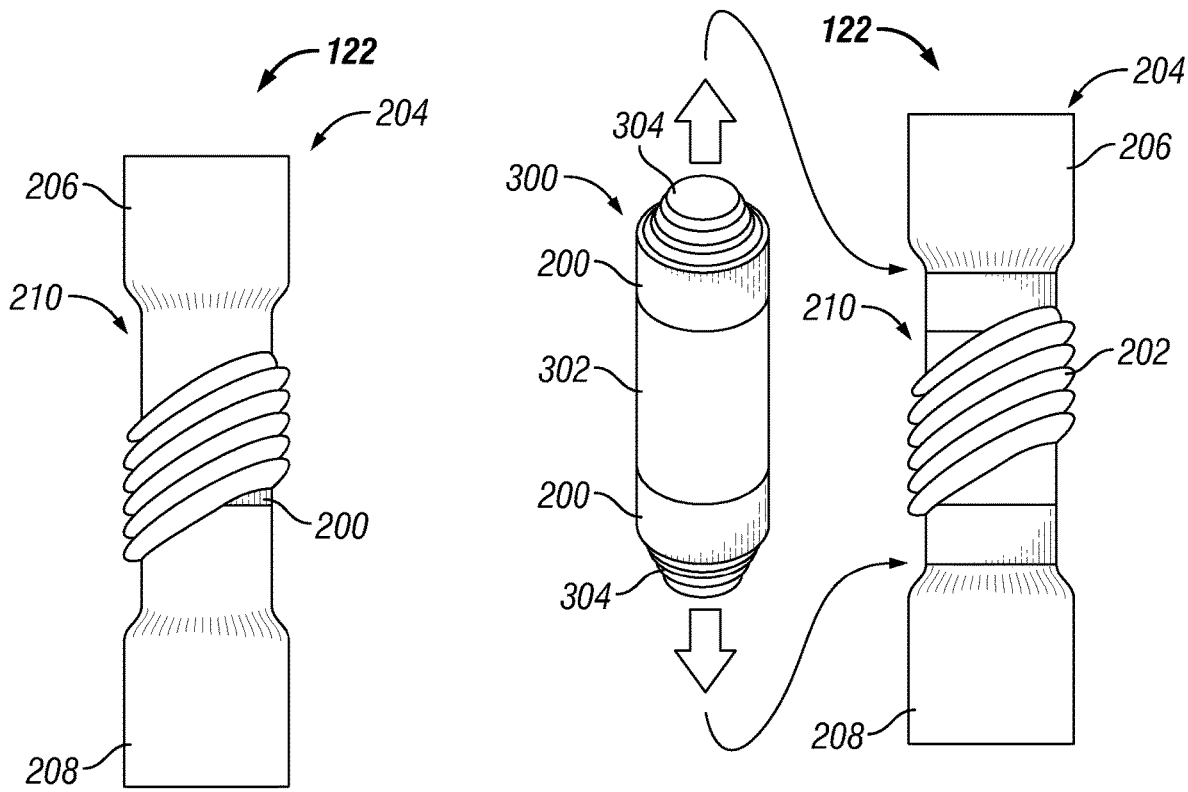
FIG. 3A
FIG. 3B
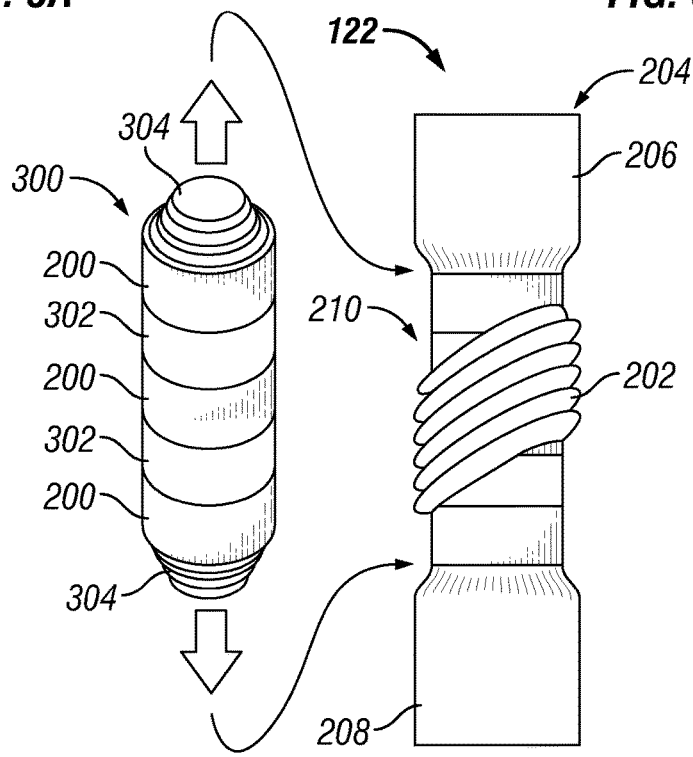
FIG. 3C

USE OF GAP SUBS BEHIND A COIL ANTENNA IN ELECTROMAGNETIC INDUCTION TOOLS

BACKGROUND

The present disclosure relates to downhole electromagnetic induction tools and, more particularly, to apparatus and methods for electrically insulating an electromagnetic induction tool to minimize current induced by an electromagnetic source on tubulars of the induction tool. As disclosed herein, the term "electromagnetic induction tool" denotes any electromagnetic tool which works at least in part based on induction principles. The term "electromagnetic induction tool" is not intended to limit the application to subterranean formation resistivity measurement and specifically includes ranging applications, where a distance and/or direction to a second wellbore may be calculated.

In well operations, it may be desirable to survey the formation using a downhole tool disposed in the wellbore. One type of downhole tool is an electromagnetic induction tool that may be used to make measurements of the electrical resistivity of earth formations penetrated by a wellbore or make measurements of distance and direction to a second well. Electromagnetic induction tools may be used in logging-while-drilling/measuring-while-drilling operations, electromagnetic ranging, wireline logging, and permanent monitoring systems, among others. Electromagnetic induction tools, or instruments, may typically comprise at least one electromagnetic source and at least one receiver. The electromagnetic source(s) and receiver(s) may be disposed on a tubular, such as a bottom hole assembly, mandrel, or casing joint. The electromagnetic induction tool may be implemented to determine the distance and direction to surrounding wells. Additionally, the electromagnetic induction tool may be disposed in a wellbore for the purpose of investigating electrical properties of subterranean formations and wells adjacent the wellbore. An electrical property of interest may be the electrical conductivity of particular portions of the formation. An alternating current having at least one frequency may be conducted through the electromagnetic source(s). The alternating current may induce eddy current to flow within the surrounding subterranean formations or in adjacent well casings. This eddy current in turn may induce voltages in the receiver(s).

However, depending on the application, currents could be flowing on the tubular associated with the electromagnetic induction tool. These currents may constitute a significant portion of the direct signal at the receiver(s). The "direct signal" may be considered the signal recorded at the receiver(s) without any target present. The target may be a second wellbore, formation inhomogeneity, a bed boundary or an approaching water/carbon dioxide front. Thus, the direct signal would be present at the receiver(s) even in a homogenous formation. It is often desirable to minimize, reject, our process out the direct signal, as the direct signal may be very large compared to the target signal. Detecting the target signal in the presence of the direct signal often requires large dynamic range, which may be difficult to obtain in downhole electronics.

Currently, "gap sub" structures may be used for blocking currents created by the electrodes on a downhole galvanic device. However, there is also a need to provide devices and methods for improving the performance of a electromagnetic induction tool. Characteristics of current on tubular may be significantly different for induction tools than galvanic tools.

BRIEF DESCRIPTION OF THE DRAWINGS

These drawings illustrate certain aspects of some examples of the present disclosure, and should not be used to limit or define the disclosure.

FIG. 3a is a schematic illustration of a mandrel with a coil antenna and no cascaded gab sub section;

FIG. 3b is a schematic illustration of a mandrel with a coil, a cascaded gap sub section with two gap subs, and metal supports;

FIG. 3c is a schematic illustration of a mandrel with a coil, a cascaded gap subs section with three gap subs, and metal supports;

DETAILED DESCRIPTION

Figure 1:
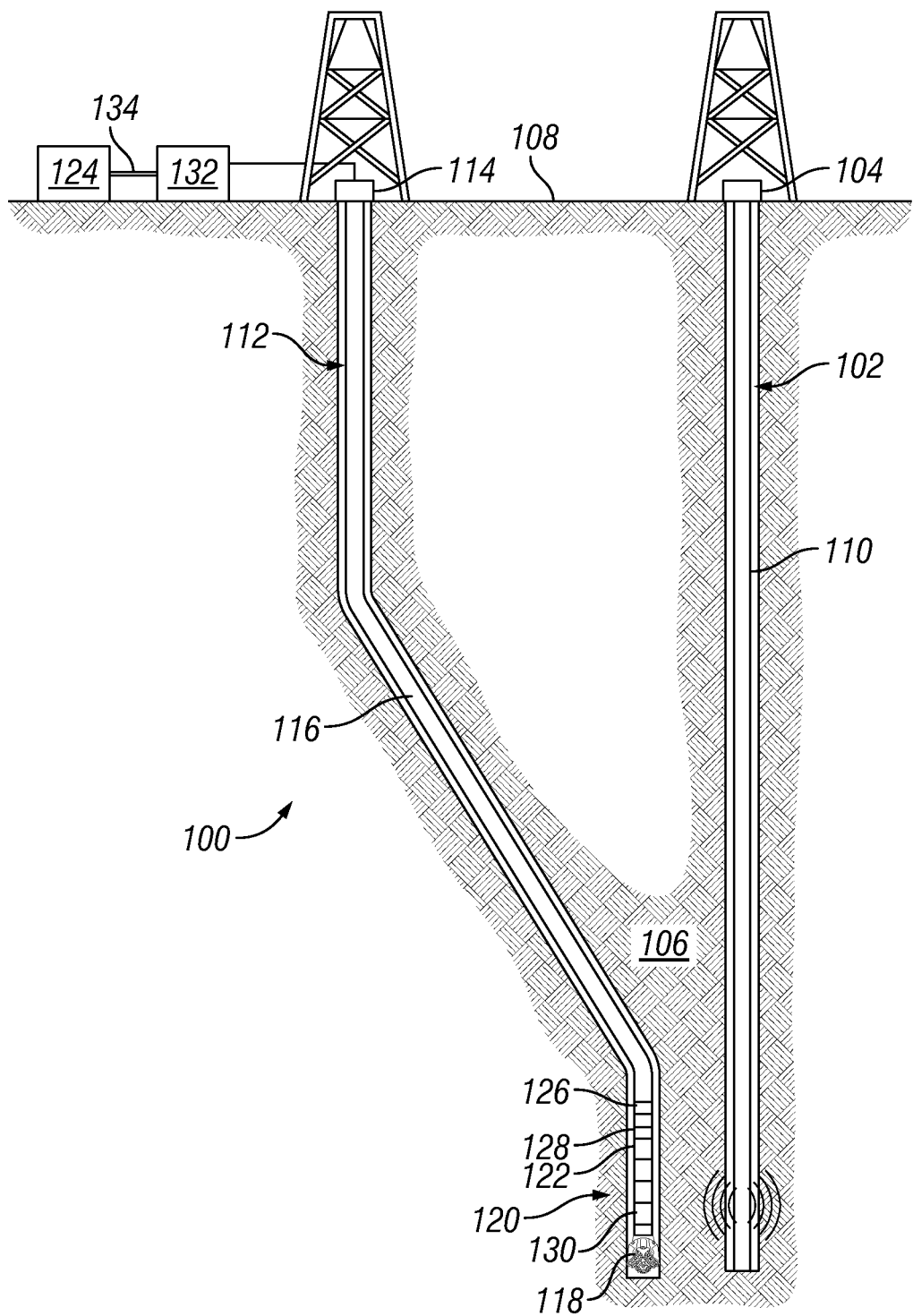
FIG. 1 is a schematic illustration of an electromagnetic induction tool in a wellbore.

This disclosure relates generally to electromagnetic induction tools and, more particularly, to use of gap subs behind a coil antenna on electromagnetic induction tools, for example, to improve gain and target sensitivity. The electromagnetic induction tools may be used in a number of electromagnetic induction tools operations, such as measuring-while-drilling (MWD), logging-while-drilling (LWD), wireline logging, and permanent monitoring operations. Specifically, this disclosure relates to the mitigation of undesired direct coupling between an electromagnetic source and a receiver in an electromagnetic induction tools. This coupling may be a result of conduction currents created on a metallic bottom hole assembly by the excitation of the electromagnetic source. In examples, tubulars may be disposed within the drill collar on a bottom hole assembly, a wireline tool mandrel, and/or permanently installed production casing. For brevity, the metallic tubular will be referred to as a bottom hole assembly below. The receiver in the electromagnetic induction tool may be a magnetometer and/or an induction coil, which may reside on the bottom hole assembly and/or outside. Similarly, where used, either electrode (source and return) may reside on the bottom hole assembly and/or outside, even on the surface.

In certain types of electromagnetic induction tools, electrical current may be injected into the formation via an electromagnetic source in the form of an electrode pair for logging, ranging, monitoring, and/or measurement purposes, among others. When these electromagnetic induction tools are used, a significant current density may form on the metallic body of the bottom hole assembly, as current may prefer highly conductive paths over less conductive ones. The receiver may be a device that senses magnetic fields (such as a magnetometer or an induction coil). The bottom hole assembly current near the receiver may create a large coupling signal. This signal (referred to as "direct signal") may be undesired, as it may overshadow the desired signal from the formation and require a large dynamic range. In examples, there may be many different techniques for eliminating or mitigating the direct signal. One technique may be to place an insulating gap sub near the receiver. This may limit the axial current strength in the neighborhood of the receiver and may also reduce the direct signal. Another example may implement a method for shifting current cancellation disposed at the gap sub to the receiver location. This may be done by applying a certain voltage (referred to as "gap voltage") between the two sides of the gap sub.

Currently, "gap sub" structures may be used for blocking axial and azimuthal currents on an electromagnetic induction tool. Gap sub structures may operate within galvanic applications in which electrodes may create downhole currents flowing in the axial and azimuthal directions of the electromagnetic induction tool. Gap subs may be an area of material that may be not conductive, which may prevent the movement electrical current in the axial and/or azimuthal direction. Gap sub material may be disposed on the outer surface of the electromagnetic induction tool and/or comprise the entire cross section of a specified area of the electromagnetic induction tool. In examples, gap subs may be devices in which voltage and/or current may be manipulated across and defined area with an energy source. This may allow an operator to "synthetically" produce an area on the electromagnetic induction tool that may prevent the movement of current and/or voltage across an area.

Systems and methods of the present disclosure may be implemented, at least in part, with an information handling system. An information handling system may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates an electromagnetic sensor system 100. Specifically, FIG. 1 shows an electromagnetic sensor system 100 for ranging. As illustrated, a target wellbore 102 may extend from a first wellhead 104 into a subterranean formation 106 from a surface 108. Generally, target wellbore 102 may include horizontal, vertical, slanted, curved, and other types of wellbore geometries and orientations. Target wellbore 102 may be cased or uncased. A conductive member 110 may be disposed within target wellbore 102 and may comprise a metallic material that may be conductive and magnetic. By way of example, conductive member 110 may be a casing, liner, tubing, or other elongated steel tubular disposed in target wellbore 102. Determining the position and direction of target wellbore 102 accurately and efficiently may be required in a variety of applications. For example, target wellbore 4 may be a "blowout" well. Target wellbore 102 may need to be intersected precisely by a second wellbore 112 in order to stop the "blowout." Alternatively, it may be desired to avoid collision with target wellbore 102 in drilling second wellbore 112 or it may be desired to drill the second wellbore parallel to the target wellbore 102, for example, in SAGD applications. In examples, target wellbore 102 may not be accessible and/or information about the position and structure of target wellbore 102 may not be available. Electromagnetic sensor system 100 may be used for determining the location of target wellbore 4 with respect to second wellbore 112.

With continued reference to FIG. 1, second wellbore 112 may also extend from a second wellhead 114 that extends into subterranean formation 106 from surface 108. Generally, second wellbore 112 may include horizontal, vertical, slanted, curved, and other types of wellbore geometries and orientations. Additionally, while target wellbore 102 and second wellbore 112 are illustrated as being land-based, it should be understood that the present techniques may also be applicable in offshore applications. Second wellbore 112 may be cased or uncased. In examples, a drill string 116 may begin at second wellhead 114 and traverse second wellbore 112. A drill bit 118 may be attached to a distal end of drill string 116 and may be driven, for example, either by a downhole motor and/or via rotation of drill string 116 from surface 108. Drill bit 118 may be a part of conductive body 120 at distal end of drill string 116. While not illustrated, conductive body 120 may further comprise one or more of a mud motor, power module, steering module, telemetry subassembly, and/or other sensors and instrumentation as will be appreciated by those of ordinary skill in the art. As will be appreciated by those of ordinary skill in the art, conductive body 120 may be a measurement-while drilling (MWD) or logging-while-drilling (LWD) system.

As illustrated, electromagnetic sensor system 100 may comprise an electromagnetic induction tool 122. While FIG. 1 illustrates use of electromagnetic induction tool 122 on drill string 116, it should be understood that electromagnetic induction tool 122 may be alternatively used on a wireline. Electromagnetic induction tool 122 may be a part of conductive body 120. Electromagnetic induction tool 122 may be used for determining the distance and direction to target wellbore 102. Additionally, electromagnetic induction tool 122 may be connected to and/or controlled by information handling system 124, which may be disposed on surface 108. In examples, information handling system 124 may communicate with electromagnetic induction tool 122 through a communication line (not illustrated) disposed in (or on) drill string 116. In examples, wireless communication may be used to transmit information back and forth between information handling system 124 and electromagnetic induction tool 122. Information handling system 124 may transmit information to electromagnetic induction tool 122 and may receive as well as process information recorded by electromagnetic induction tool 122. In addition, electromagnetic induction tool 122 may include a downhole information handling system 126, which may also be disposed on conductive body 120. Downhole information handling system 126 may include a microprocessor or other suitable circuitry, for estimating, receiving and processing signals received by the electromagnetic induction tool 122. Downhole information handling system 126 may further include additional components, such as memory, input/output devices, interfaces, and the like. While not illustrated, the electromagnetic induction tool 122 may include one or more additional components, such as analog-to-digital converter, filter and amplifier, among others, that may be used to process the measurements of the electromagnetic induction tool 122 before they may be transmitted to surface 108. Alternatively, raw measurements from electromagnetic induction tool 122 may be transmitted to surface 108.

In examples, electromagnetic induction tool 122 may comprise an electromagnetic source 128 and/or a receiver 130. It should be noted that electromagnetic induction tool 122 may comprise a plurality of electromagnetic sources 128 and/or a plurality of receivers 130. The plurality of electromagnetic sources 128 and the plurality of receivers 130 may be disposed along a longitudinal axis of the electromagnetic induction tool 122. As disclosed, the concepts that are described herein are valid for any type of electromagnetic source 128 and receiver 130. As an example, wire antenna, toroidal antenna and/or azimuthal button electrodes, transmitter coils, and/or receiver coils may also be used in the place of the electromagnetic source 128 and/or the receiver 130. Electromagnetic source 128 and/or receiver 130 may be disposed on and/or adjacent to a gap sub. In examples, there may be more than one gap sub in which electromagnetic source 128 and/or receiver 130 may be disposed on and/or adjacent to.

During downhole operations in which electromagnetic induction tool 122 may be utilized, an azimuthal current may be present within areas in which electromagnetic sources 128 and/or receivers 130 may be disposed. Azimuthal currents may be especially pronounced when electromagnetic source 128 and/or receiver 130 may be coaxial. Azimuthal currents and axial currents may be induced on electromagnetic induction tool 122. In examples, electromagnetic source 128 and receiver 130 may be spaced axially on along the central or z-axis of electromagnetic induction tool 122. In some examples, electromagnetic source 128 and/or receiver 130 may be tilted at an angle, for example of about forty-five degrees. To prevent the movement of azimuthal and/or axial currents along electromagnetic induction tool 122, a gap sub, discussed below, may be employed.

Any suitable technique may be used for transmitting signals from electromagnetic induction tool 122 to surface 108, including, but not limited to, wired pipe telemetry, mud-pulse telemetry, acoustic telemetry, and electromagnetic telemetry. While not illustrated, conductive body 120 may include a telemetry subassembly that may transmit telemetry data to the surface. An electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer 132. Digitizer 132 may supply a digital form of the telemetry signals to information handling system 124 via a communication link 134, which may be a wired or wireless link. The telemetry data may be analyzed and processed by information handling system 124. For example, the telemetry data could be processed to determine location of target wellbore 102. With the location of target wellbore 102, a driller could control the conductive body 120 while drilling second wellbore 112 to intentionally intersect target wellbore 102, avoid target wellbore 102, and/or drill second wellbore 112 in a path parallel to target wellbore 102.

Figure 2A:
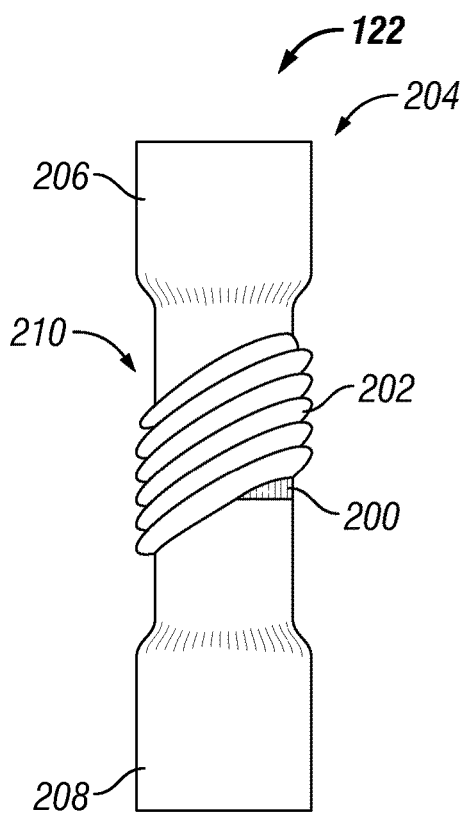
FIG. 2a is a schematic illustration of a mandrel which may comprise a coil antenna, a gap sub, and a metal support.
Figure 2B:
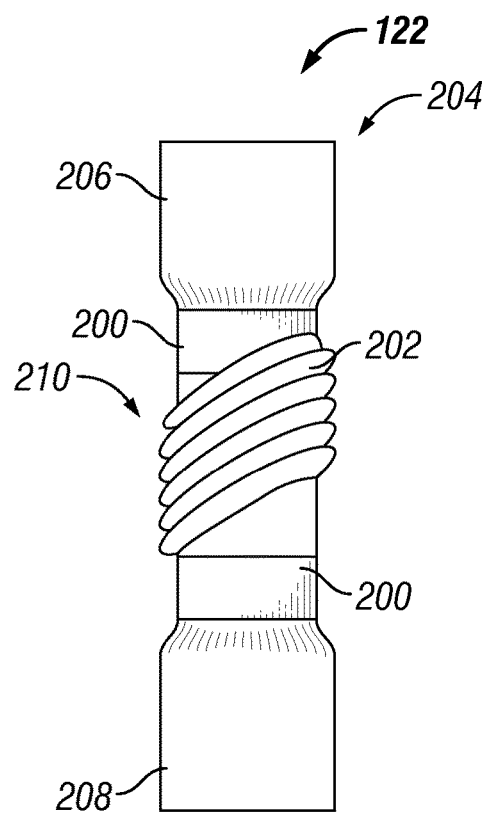
FIG. 2b is a schematic illustration of a mandrel which may comprise a coil antenna, two gap subs, and a metal support.
Figure 2C:
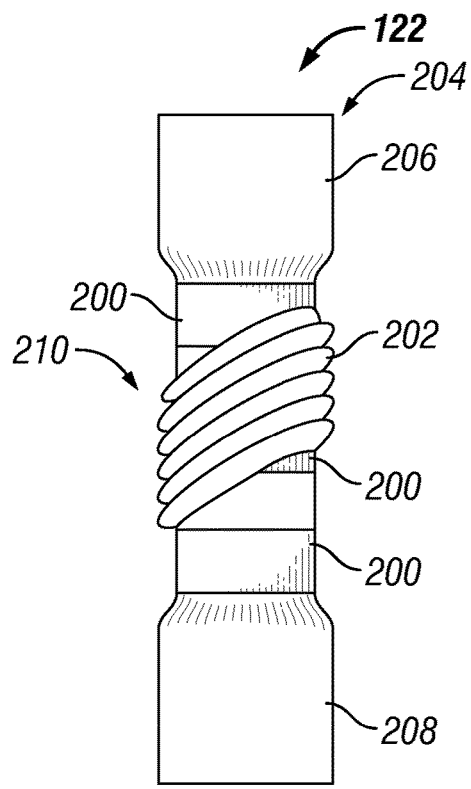
FIG. 2c is a schematic illustration of a mandrel which may comprise a coil antenna, three gap subs, and a metal support.

FIGS. 2a-2c illustrate electromagnetic induction tool 122 without and/or with gap sub 200 disposed at and/or about coil antenna 202. Gap sub 200 may be disposed away from coil antenna 202 at about zero inches to about twenty four inches, about three inches to about twelve inches, about six inches to about eighteen inches, and/or about one inch to about three inches. In examples, gap sub 200 may hinder, decrease, and/or prevent the movement of axial and/or azimuthal current along electromagnetic induction tool 122. Gap sub 200 may comprise any suitable material capable of hindering, decreasing, and/or preventing the movement of axial and/or azimuthal current. Suitable material may be, but is not limited to ferrite or conductive material. Coil antenna 202 may be electromagnetic source 128 and/or receiver 130, which are shown on FIG. 1. In examples, FIG. 2a illustrates a single gap sub 200 and coil antenna 202 disposed on gap sub 200. Electromagnetic induction tool 122 may comprise a mandrel 204, which may further comprise first portion 206, a second portion 208, and a center portion 210. Center portion 210 may be disposed between first portion 206 and second portion 208. In examples, gap sub 200 and coil antenna 202 may be disposed on center portion 210. FIG. 2b illustrates two gap subs 200 and coil antenna 202 disposed on and/or about gap subs 200. Gap subs 200 and coil antenna 202 may be disposed on center portion 210, wherein center portion 210 may be disposed between first portion 206 and second portion 208. FIG. 2c illustrates three gap subs 200 and coil antenna 202 disposed on and/or about gap subs 200. In examples, gap subs 200 and coil antenna 202 may be disposed on center portion 210, wherein center portion 210 may be disposed between first portion 206 and second portion 208. It should be understood that there may be any number of gap subs 200 that may be disposed at and/or about coil antenna 202. In examples, current may be produced by coil antenna 202 and may be localized in the vicinity of coil antenna 202. The magnitude of the current may decrease as the current moves along electromagnetic induction tool 122 away from coil antenna 202, in any direction. The current moving along electromagnetic induction tool 122 may move in a direction opposite of the current moving through coil antenna 202. This movement of current through electromagnetic induction tool 122 may be equated with an image theory or physical optics approximation using Equation (1), disclosed below:

$$J_{ind} = 2\hat{n} \times H \qquad (1)$$

where Jind is the induced current density, n is the surface normal vector, and H is the magnetic field. In examples, the current induced near coil antenna 202 may move in a loop with a tilted angle. This may create another tilted magnetic moment in the opposite direction as the original 45 degree tilted moment, which may be found in coil antenna 202. Therefore, comparing the original 45 degree tilted dipole, the presence of mandrel 204 may weaken the field.

FIGS. 3a-3b illustrate how gap subs 200 may be disposed behind coil antenna 202. Rather than the section behind coil antenna 202 being completely insulated by gap sub 200, which may not be good for mechanical stability in the downhole drilling environment, a cascaded gap sub section 300 with metal supports 302 in-between gap subs 200 may be better for the mechanical stability of electromagnetic induction tool 122. Cascaded gap sub section 300 may range in length, from about one foot to about twenty feet, about three feet to about sixteen feet, about six feet to about twelve feet, about four feet to about ten feet, and/or about five feet to about fifteen feet. Additionally, metal supports 302 may range in length, from about one foot to about six feet, about two feet to about four feet, and/or about three feet to about six feet. It should be understood that lengths outside this specific ranges may also be used. Metal supports 302 may be any suitable material, including, but not limited to, steel, titanium, stainless steel, carbon fiber, and/or the like. Cascaded gap sub section 300, which may be center portion 210, may be disposed between first portion 206 and second portion 208 on mandrel 204. Cascaded gap sub section 300 may be a single insert with connectors 304 on both ends. Connectors 304 may comprise any suitable connector, including, but not limited to, threaded connections, bolted connection, pressed connection, and/or the like.

Cascaded gap sub section 300 may function as a removable structure that may be customized for different environments. In examples, cascaded gap sub section 300 may comprise a selected number of gap subs 200, in which a coil antenna 202 may be disposed over and/or adjacent to. Cascaded gap sub section 300 may then be attached to first portion 206 and/or second portion 208 through connectors 304.

FIGS. 3a-3c may illustrate specific examples of coil antenna 202 and gap sub 200 disposed on mandrel 204. FIG. 3a illustrates an electromagnetic induction tool 122 with coil antenna 202 disposed on mandrel 204 with gap sub 200. FIG. 3b illustrates an electromagnetic induction tool 122 with cascade gap sub section 300 disposed within mandrel 204 and between first portion 206 and second portion 208. Coil antenna 202 may be disposed on cascade gap sub section 300. Cascade gap sub section 300 may comprise a single gap sub 200 and/or a plurality of gap subs 200, metal supports 302, and a plurality of connectors 304. Connectors 304 may connect cascade gap sub section 300 to mandrel 204. FIG. 3c illustrates a cascade gap sub section 300 with a plurality of gap subs 200.

Figure 4C:
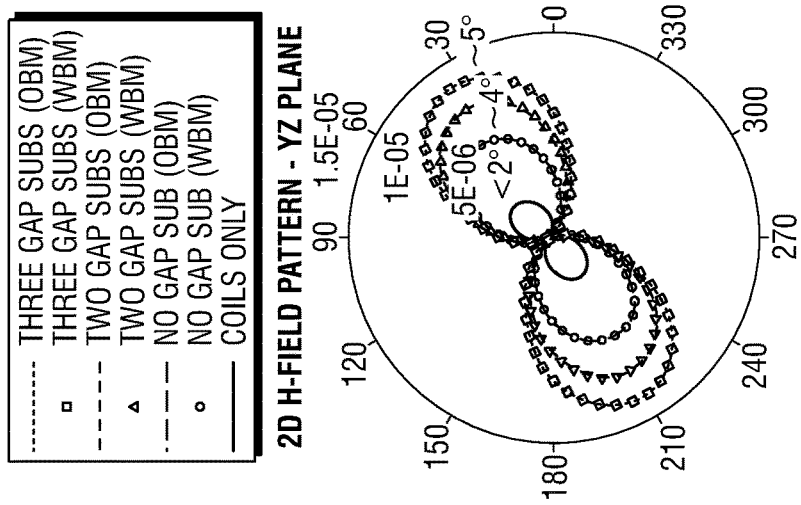
FIG. 4c illustrates a graph of the longitudinal H-field patterns of a coil with and without gap subs for the YZ Plane.
Figure 4B:
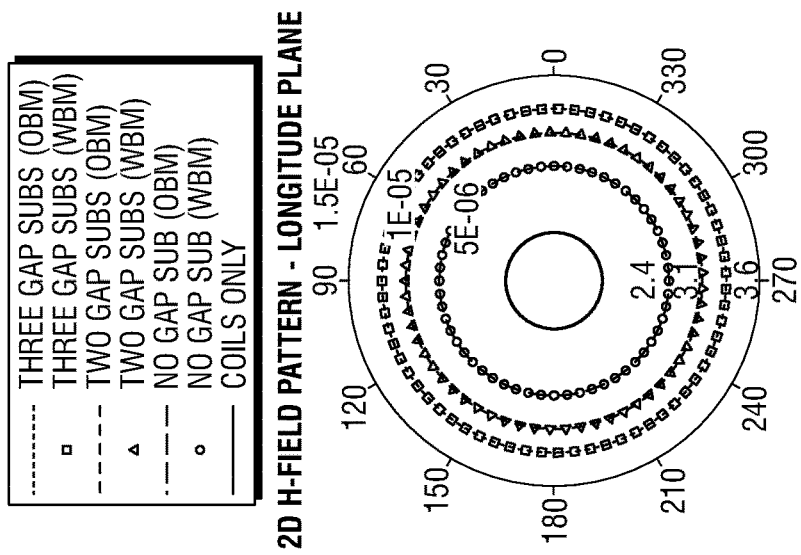
FIG. 4b illustrates a graph of the longitudinal H-field patterns of a coil with and without gap subs for the Longitude Plane.
Figure 4A:
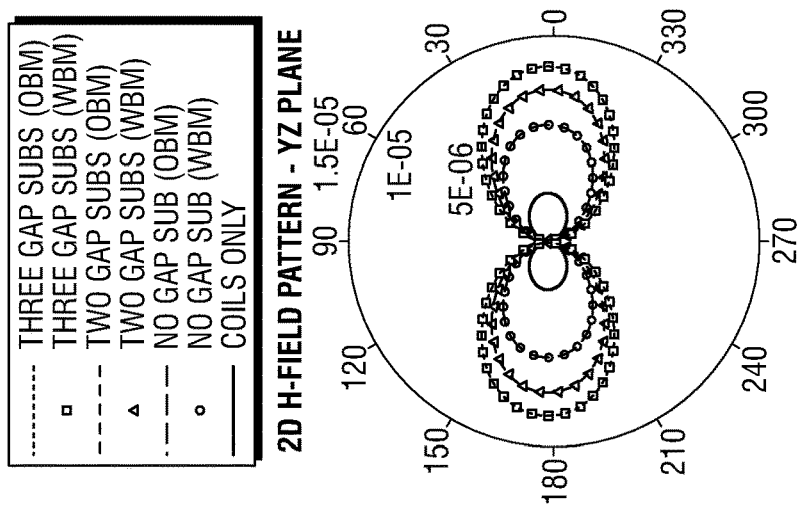
FIG. 4a illustrates a graph of the longitudinal H-field patterns of a coil with and without gap subs for the YZ plane.

FIGS. 4a-4c are longitudinal H-field patterns illustrating the use of cascaded gap sub sections 300 (e.g., shown on FIGS. 3a-3c). As illustrated, the longitudinal H-field patterns of coil antenna 202 (e.g., shown on FIGS. 3a-3c) with and without gap subs 200 (e.g., show on FIGS. 3a-3c) are plotted in FIG. 4a for the YZ Plane, FIG. 4b for the Longitude Plane, and FIG. 4c for the YZ Plane. Each graph may be prepared for frequency 1 kHz. There may be any suitable amount of spacing between gap subs 200. For example, a suitable amount of spacing may be about two inches to about fifteen inches. FIGS. 4a-4c illustrate specific gap sizes between gap subs 200. In the two-gap-sub design, the spacing between adjacent gap subs 200 may be seven inches while it may be two inches for the three-gap-sub design. This may make both cascaded gap sub section 300 thirteen inches long. Because coil antenna 202 may have a tilted angle of about ten degrees to about ninety degrees, specifically forty five degrees, the longitude plane may be defined to be the plane after 45° clockwise rotation of the x-y plane while latitude plane may be the plane after 45° counterclockwise rotation of the x-y plane. In any of these cases, the pattern may have a shape of a tilted donut resembling that of a tilted magnetic dipole resulting from coil antenna 202 being titled. Furthermore, these pattern plots show that adding gap subs 200 underneath coil 22 may increase the effective gain while also slightly increasing the tilted angle offset from 45° axis. Currents on mandrel 204 may flow in a tilted loop in the direction opposite to current on coil antenna 202, this in essence creates a magnetic dipole moment in approximately the opposite direction to counter the original magnetic moment from coil antenna 202, which may be defined as counter current. By putting gap subs 200 behind coil antenna 202, it may reduce this counter current of the induced currents and thus make the effective gain larger, which may increase sensitivity of coil antenna 202. Moreover, FIG. 4 also includes the simulation for both oil-based mud (OBM) with (R=1000 Ω·m) and water-based mud (WBM) (R=0.5 Ω·m) within borehole and their patterns almost overlay on top of each other, which may suggest that the mud does not introduce any significant impact to the field patterns.

In a simulated example at 1 kHz, the effective gain for coil antenna 202 without gap sub 200 may be found to be 2.4 more than that of coil antenna 202 only (without mandrel) while coil antenna 202 with two and/or three gap subs 200 may be 3.1 more than that of a coil antenna 202 only and/or 3.6 more than that of a coil antenna 202 only, respectively. Moreover, the 45° angle offset may be determined to be approximately 4° and 5° for two and three gap subs 200 as opposed to around 2° without gap sub 200. These numbers are summarized in Table I for effective gains and tilted angel offsets below:

TABLE I

| Frequency 1 | Effective | Tilted Angle offset from 45° |
|---|---|---|
| No gap sub | 2.4x | <2° |
| With two gap subs behind | 3.1x | 4° |
| With three gap subs behind | 3.6x | 5° |

Table I may suggest that putting gap subs 200 behind coil antenna 202 may increase the effective gain.

The direct coupling between electromagnetic source 128 and receiver 130 may be broken into portions. A portion of the direct signal from electromagnetic source 128 and the coupling through mandrel 204. Direct signals from the electromagnetic source 128 may be the same. Coupling through mandrel 204 may be further decomposed into two parts: azimuthal mandrel currents contribution and axial mandrel currents contribution. This is based on the equivalence principle that the coupling effect, which may be computed by an information handling system (e.g., downhole information handling system 126 shown on FIG. 1). The information handling system may calculate the induced currents as equivalent sources in free space. Induced azimuthal and axial currents may be coupled to a received electromagnetic field voltage. Even when there may not be net axial current, the received electromagnetic field voltage may be non-zero. Therefore, when making assessment of which current contributions have dominant impact to the received electromagnetic filed voltage, the half-turn currents may be compared instead of the full-turn currents (net current).

Figure 5A:
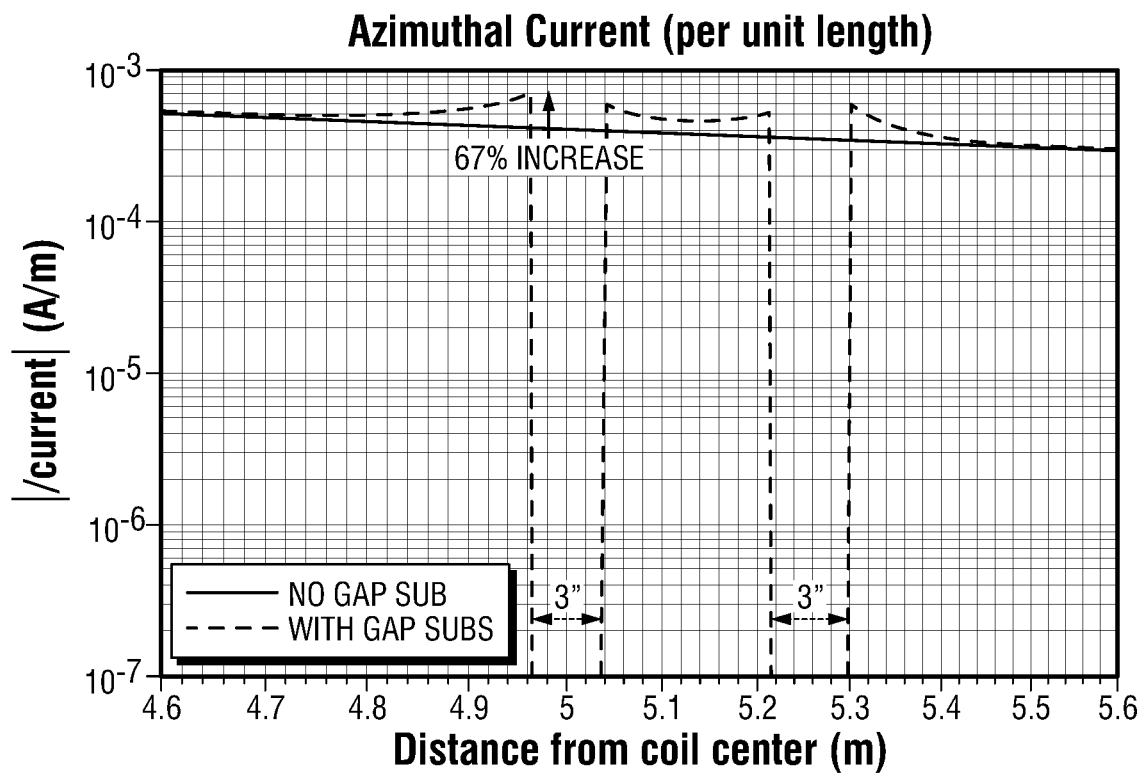
FIG. 5a illustrates a graph of the azimuthal current with two gap subs.
Figure 5B:
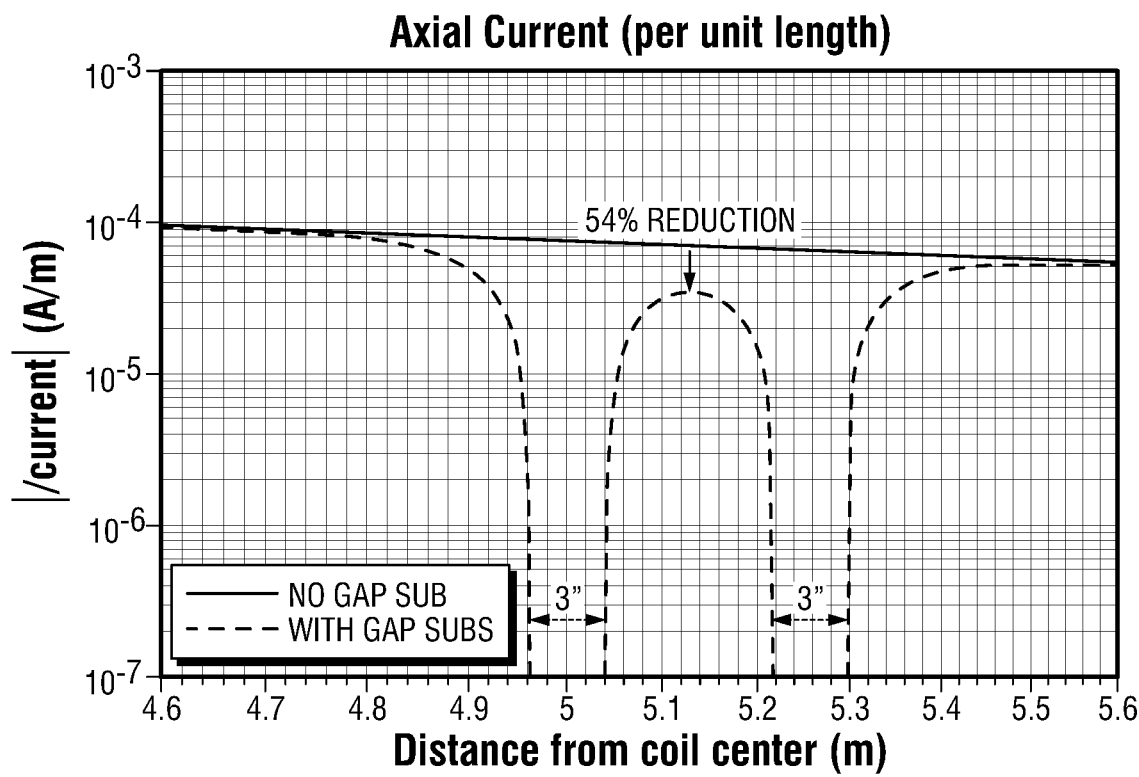
FIG. 5b illustrates a graph of the axial current with two gap subs.
Figure 6A:
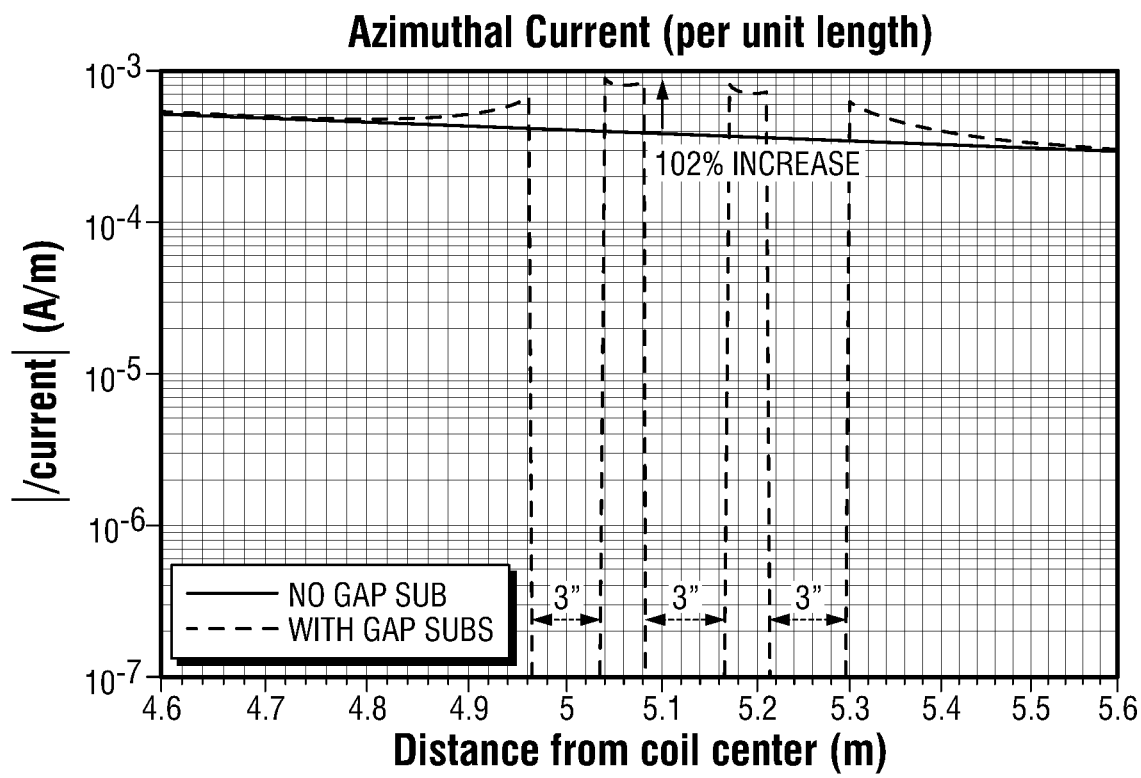
FIG. 6a illustrates a graph of the azimuthal current with three gap subs.
Figure 6B:
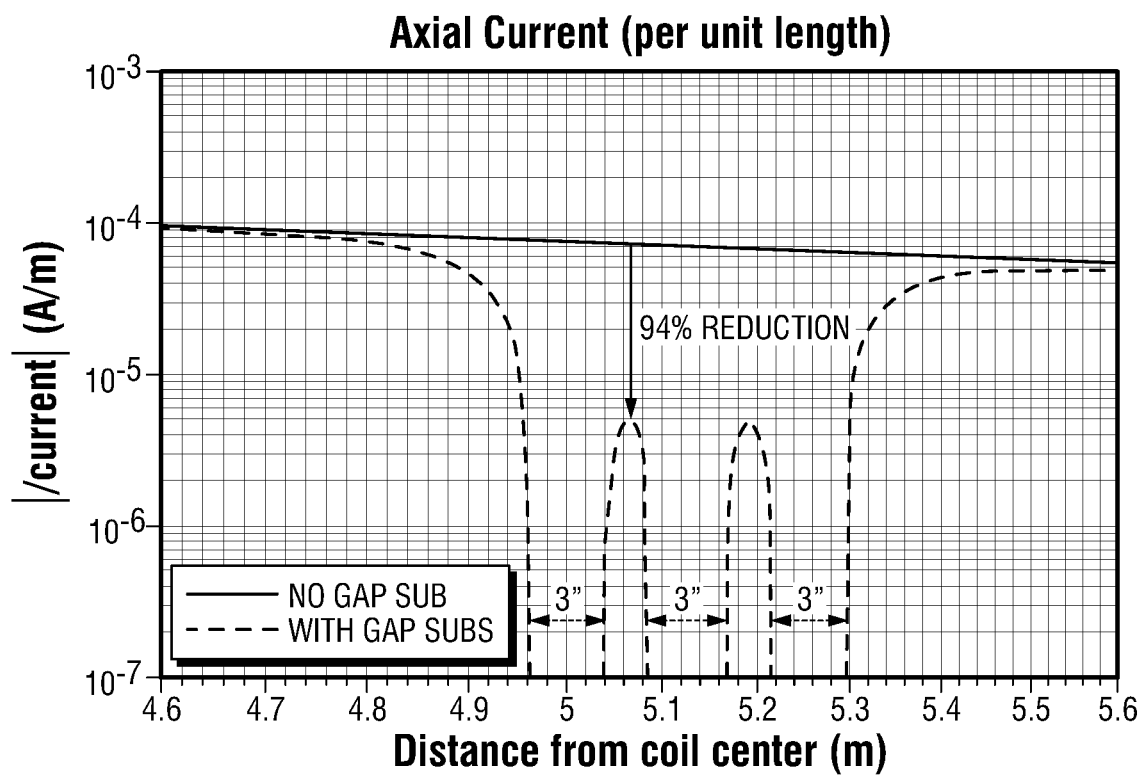
FIG. 6b illustrates a graph of the axial current with three gap subs.

FIGS. 5a, 5b, 6a, and 6b display a simulated example with both azimuthal and axial currents within electromagnetic induction tool 122. FIGS. 5a and 5b illustrate cascaded gap sub section 300 (e.g., shown on FIGS. 3a-3c) that may comprise two gap subs 200 (e.g., shown on FIGS. 3a-3c). In examples, gap subs 200 may be five meters away from coil antenna 202 at 1 kHz with a formation resistivity of 10 Ω·m. FIG. 5a illustrates an increase in azimuthal current and FIG. 5b illustrates a decrease in axial current. FIGS. 6a and 6b illustrates cascaded gap sub section 300 that may comprise three gap subs 200. In examples, gap subs 200 may be five meters away from coil antenna 202 at 1 kHz with a formation resistivity of 10 Ω·m. FIG. 6a illustrates a larger increase in azimuthal current from FIG. 5a and FIG. 6b illustrates a larger decrease in axial current than FIG. 5b.

As illustrated by FIGS. 6a and 6b, having three gap subs 200 may provide a much more persistent isolation for the axial currents compared to that of two gap subs 200, but this may come at the expense of higher azimuthal currents in between gap subs 200. Therefore, the use of multi-gap-sub designs may work well at distances in which the axial currents become more dominant than the azimuthal currents. One should also note that in this particular simulated example, azimuthal current may be stronger than the axial current which may suggest that reduction in axial current across the board may not be sufficient to offset the increase in azimuthal currents between gap subs 200. Consequently, the received electromagnetic filed voltage with gap subs 200 may not be smaller than that without gap sub 200.

Table II below may be used to illustrates whether azimuthal current or axial current may be stronger in electromagnetic induction tool 122. In another simulated example, the actual received electromagnetic field voltage within electromagnetic source 128 and receiver 130 may be computed and their voltage values may be illustrated below in Table II for arrangements both with and without gap subs 200.

TABLE II

| EMF Voltage at the Receiver | Coupling Voltage (Tr-Rcv) (Volts) | |
|---|---|---|
| | Complex Voltage | Abs |
| Mandrel with no gap sub | 6.1068E−06-6.2928E−05i | 6.32E−05 |
| Mandrel with two gap subs behind receiver | 7.4630E−06-7.2669E−05i | 7.31E−05 |
| Mandrel with three gap subs behind receiver | 8.3019E−06-7.8473E−05i | 7.89E−05 |

As illustrated in Table II, the azimuthal current may be stronger. However, when comparing Table I and Table II side by side, one may see that the effective gain for the two-gap-sub design may increase by about 30% while the direct coupling may increase by 15%. That may be a net gain of 13% in target sensitivity of target wellbore 102. For the three-gap-sub design, the effective gain may increase by about 50% while the direct coupling may increase by 25% which may result in a net gain of 20% in target sensitivity. It should be noted that the increases in target sensitivity of these designs may come at the expense of a slightly larger angle offset. Even though a 13% or 20% increase in target sensitivity might be small, it may be the difference between being able to locate target wellbore 102 at 50 meters as opposed to just 30 meters. Thus, gap subs 200 may be more effective in blocking the axial current, the performance may be better for larger electromagnetic source-receiver spacing and smaller formation depth.

Figure 7:
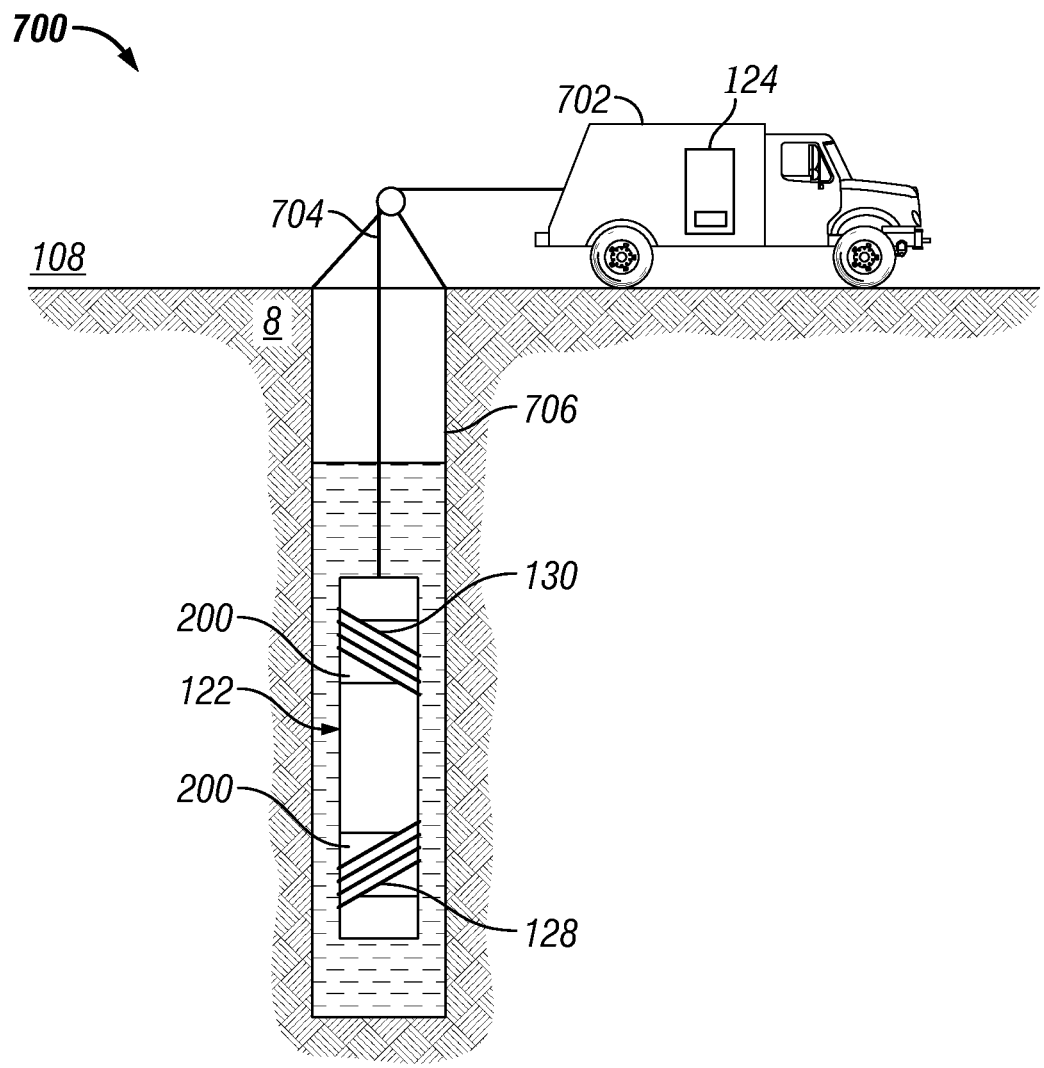
FIG. 7 is a schematic illustration of a wireline system.

In some embodiments, electromagnetic sensor system 100 may be incorporated into a wireline tool. FIG. 7 illustrates an example of a wireline system 700. Wireline system 700 may comprise a recovery vehicle 702, wireline 704, and/or electromagnetic induction tool 122. Recovery vehicle 700 may be disposed at surface 108 of wellbore 706. Recovery vehicle 702 may include a spool (not shown) for raising and lowering wireline 704 in wellbore 706. As illustrated, electromagnetic induction tool 122 may be coupled to wireline 704, for example, at a distal end of wireline 704. Electromagnetic induction tool 122 may include electromagnetic source 128 and receiver 130. As previously described, transmitter 128 and receiver 130 may be disposed over gap sub 200 and/or a plurality of gap subs 200. In examples, gap subs 200 may be insulated to minimize the azimuthal currents on electromagnetic induction tool 122, thus reducing the direct signal between electromagnetic source 128 and receiver 130. Signals from receiver 130 may be transmitted to an information handling system 124, which may be disposed on recovery vehicle 700, for example. It should be understood that other types of wireline systems may be employed, including those in which the wireline is disposed from a spool that is installed at surface 108 instead of being located on a recovery vehicle 700. Specific information about subterranean formation 106, such as resistivity, may be inferred from analysis of the signal from receiver 130. In certain examples, a wireline log may be developed from the signal that includes information about subterranean formation 106, such as formation resistivity.

Figure 8:
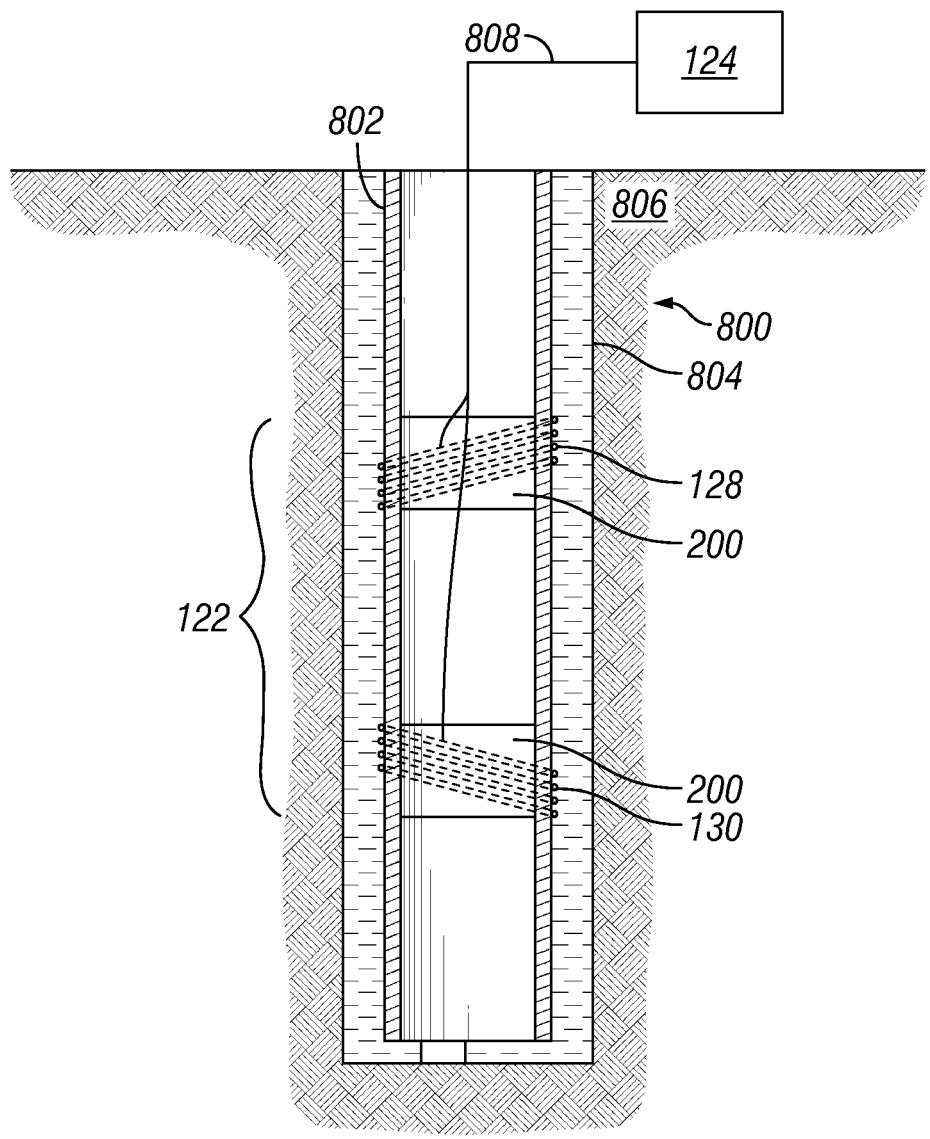
FIG. 8 is a schematic illustration of a permanent monitoring system.

FIG. 8 illustrates an example of a permanent monitoring system 800 in which electromagnetic induction tool 122 has been incorporated. As will be appreciated, permanent monitoring system 800 may be used to monitor formation properties, including approaching flood fronts (not illustrated). In examples, permanent monitoring system 800 may comprise a casing 802 disposed within wellbore 804 penetrating subterranean 806. Permanent monitoring system 800 may also comprise electromagnetic induction tool 122, which may comprise electromagnetic source 128 and receiver 130. As previously described, electromagnetic source 128 and receiver 130 may be disposed over gap sub 200 and/or a plurality of gap subs 200. In examples, gap subs 200 may be insulated to minimize the axial and/or azimuthal currents on electromagnetic induction tool 122, thus reducing the direct signal between electromagnetic source 128 and receiver 130. Information handling system 124 may connect to electromagnetic source 128 and/or receiver 130 through communication link 808. Signals from receiver 130 may be transmitted to information handling system 124 by way of communication link 808. Specific information about subterranean formation 806, such as resistivity, approaching flood front, etc., may be inferred from analysis of the signal from receiver 130.

This apparatus and method may include any of the various features of the compositions, methods, and system disclosed herein, including one or more of the following statements.

Statement 1: An electromagnetic induction tool comprising: a tool body; a gap sub that separates different sections of the tool body and is positioned to at least partially hinder flow of an axial current and an azimuthal current on the tool body; and a coil antenna, wherein the coil antenna is disposed over the gap sub.

Statement 2: The electromagnetic induction tool of statement 1, wherein the coil antenna comprises a receiver or electromagnetic source.

Statement 3: The electromagnetic induction tool of statements 1 and 2, wherein the coil antenna is disposed about ten degrees to about ninety degrees from an axis of the electromagnetic induction tool.

Statement 4: The electromagnetic induction tool of statement 1, wherein the electromagnetic induction tool comprises a plurality of gap subs, wherein the coil antenna is disposed over the plurality of gap subs.

Statement 5: The electromagnetic induction tool of statements 1 or 4, wherein the coil antenna comprises a receiver or electromagnetic source.

Statement 6: The electromagnetic induction tool of any one of statements 1, 4, or 5, wherein the coil antenna is disposed about ten degrees to about ninety degrees from an axis of the electromagnetic induction tool, wherein the plurality of gap subs are spaced by one or more metal supports, wherein the plurality of gap subs comprise the gap sub.

Statement 7: The electromagnetic induction tool of statement 1, wherein the electromagnetic induction tool comprises a plurality of coil antennae, wherein each of the plurality of coil antennae are disposed over at least one gap sub.

Statement 8: The electromagnetic induction tool of statements 1 or 7, wherein the plurality of coil antennae each individually comprises a receiver or an electromagnetic source.

Statement 9: The electromagnetic induction tool of any one of statements 1, 7, or 8, wherein the coil antenna is disposed about ten degrees to about ninety degrees from an axis of the electromagnetic induction tool.

Statement 10: The electromagnetic induction tool of any preceding statement, wherein the gap sub comprises ferrite or conductive materials.

Statement 11: A method of increasing an electromagnetic field comprising: providing a electromagnetic induction tool, wherein the electromagnetic induction tool comprises a tool body; a gap sub that separates different sections of the tool body and is positioned to at least partially hinder flow of an axial current and an azimuthal current on the tool body; and a coil antenna, wherein the coil antenna is disposed over the gap sub; placing the electromagnetic induction tool into a wellbore; and operating the coil antenna.

Statement 12: The method of statement 11, wherein the electromagnetic induction tool further comprises a plurality of coil antennas on the electromagnetic induction tool, wherein the plurality of coil antennas each cover at least one gap sub.

Statement 13: The method of statements 11 and 12, wherein the plurality of coil antennas each individually comprises a receiver or an electromagnetic source.

Statement 14: The method of any one of statements 11 to 13, wherein the plurality of coil antennas are disposed about ten degrees to about ninety degrees from an axis of the electromagnetic induction tool.

Statement 15: The method of statement 11, wherein the electromagnetic induction tool further comprises a plurality of gab subs on the electromagnetic induction tool, wherein the coil antenna covers the plurality of gap subs.

Statement 16: The method of statement 11 or 15, wherein the coil antenna is a receiver or an electromagnetic source.

Statement 17: The method of statements any one of statements 11, 15, or 16, wherein the coil antenna is disposed about ten degrees to about ninety degrees from an axis of the electromagnetic induction tool.

Statement 18: The method of any one of statements 11 to 17, wherein the gap sub comprises ferrite or conducive materials.

Statement 19: The method of any one of statements 11 to 18, wherein the gap sub functions to increase the gain.

Statement 20: The method of any one of statements 11 to 19, wherein the gap sub hinders a counter current, increasing the electromagnetic field emitted from the coil antenna.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. An electromagnetic induction tool comprising:
a tool body;
a cascaded gap sub section comprising circumferential bands stacked in an axial direction, wherein the circumferential bands comprise gap subs and a metal support that is disposed in-between the gap subs, the cascaded gap sub section configured to separate different sections of the tool body and positioned to reduce flow of an axial current and an azimuthal current across the gap subs, wherein the cascaded gap sub section connects collars along a bottom hole assembly, wherein the axial current and the azimuthal current are secondary currents resulting from induced electromagnetic fields; and
a coil antenna, wherein the coil antenna encompasses and contacts a portion of the cascaded gap sub section that reduces the flow of the currents across the cascaded gap sub section, or wherein the coil antenna encompasses a portion of the tool body that is adjacent to the cascaded gap sub section.

2. The electromagnetic induction tool of claim 1, wherein the coil antenna comprises a receiver or electromagnetic source, wherein the cascaded gap sub section is a single insert with a connector on each end, wherein the connectors are at least threaded, bolted, or pressed to the sections of the tool body.

3. The electromagnetic induction tool of claim 2, wherein the coil antenna is disposed about ten degrees to about ninety degrees from an axis of the electromagnetic induction tool.

4. The electromagnetic induction tool of claim 1, wherein the cascaded gap sub section further comprises additional circumferential bands stacked in the axial direction, wherein the additional circumferential bands comprise additional gap subs and additional metal supports that are disposed in-between the additional gap subs, wherein the coil antenna is disposed over all of the gap subs.

5. The electromagnetic induction tool of claim 4, wherein the coil antenna comprises a receiver or electromagnetic source.

6. The electromagnetic induction tool of claim 4, wherein the coil antenna is disposed about ten degrees to about ninety degrees from an axis of the electromagnetic induction tool.

7. The electromagnetic induction tool of claim 1, wherein the electromagnetic induction tool comprises a plurality of coil antennae, wherein each of the plurality of coil antennae are disposed over at least one gap sub.

8. The electromagnetic induction tool of claim 7, wherein the plurality of coil antennae each individually comprises a receiver or an electromagnetic source.

9. The electromagnetic induction tool of claim 8, wherein the coil antenna is disposed about ten degrees to about ninety degrees from an axis of the electromagnetic induction tool.

10. The electromagnetic induction tool of claim 1, wherein the gap subs comprise ferrite or conductive materials.

11. A method of increasing an electromagnetic field comprising:
providing an electromagnetic induction tool, wherein the electromagnetic induction tool comprises:
a tool body;
a cascaded gap sub section comprising circumferential bands stacked in an axial direction, wherein the circumferential bands comprise gap subs and a metal support that is disposed in-between the gap subs, the cascaded gap sub section configured to separate different sections of the tool body and positioned to reduce flow of an axial current and an azimuthal current across the gap subs, wherein the cascaded gap sub section connects collars along a bottom hole assembly, wherein the axial current and the azimuthal current are secondary currents resulting from induced electromagnetic fields; and
a coil antenna, wherein the coil antenna encompasses and contacts a portion of the cascaded gap sub section that reduces the flow of the currents across the cascaded gap sub section, or wherein the coil antenna encompasses a portion of the tool body that is adjacent to the cascaded gap sub section;
placing the electromagnetic induction tool into a wellbore; and
operating the coil antenna.

12. The method of claim 11, wherein the electromagnetic induction tool further comprises a plurality of coil antennas on the electromagnetic induction tool, wherein the plurality of coil antennas each cover at least one gap sub, wherein the cascaded gap sub section is a single insert with a connector on each end, wherein the connectors are removably coupled to sections of the tool body, wherein the connectors are at least threaded, bolted, or pressed to the sections of the tool body.

13. The method of claim 12, wherein the plurality of coil antennas each individually comprises a receiver or an electromagnetic source.

14. The method of claim 13, wherein the plurality of coil antennas are disposed about ten degrees to about ninety degrees from an axis of the electromagnetic induction tool.

15. The method of claim 11, wherein the cascaded gap sub section further comprises additional circumferential bands stacked in the axial direction, wherein the additional circumferential bands comprise additional gap subs and additional metal supports that are disposed in-between the additional gap subs, wherein the coil antenna covers all the gap subs.

16. The method of claim 15, wherein the coil antenna is a receiver or an electromagnetic source.

17. The method of claim 16, wherein the coil antenna is disposed about ten degrees to about ninety degrees from an axis of the electromagnetic induction tool.

18. The method of claim 11, wherein the gap subs comprise ferrite or conducive materials.

19. The method of claim 11, wherein the gap subs function to increase the gain.

20. The method of claim 11, wherein the gap subs hinder a counter current, increasing the electromagnetic field emitted from the coil antenna.

* * * * *